US008914403B2

(12) United States Patent
Alpern et al.

(10) Patent No.: US 8,914,403 B2
(45) Date of Patent: Dec. 16, 2014

(54) SCALABLE PACKAGE MANAGEMENT FOR VIRTUAL-MACHINE IMAGES

(75) Inventors: Bowen L. Alpern, Hawthorne, NY (US);
Glenn S. Ammons, West Chester, PA (US); Mona Attariyan, Ann Arbor, MI (US); Vasanth Bala, Rye, NY (US);
Todd W. Mummert, Danbury, CT (US);
Darrell C. Reimer, Tarrytown, NY (US); Jian Yin, Richland, WA (US);
Xiaolan Zhang, Dobbs Ferry, NY (US)

(73) Assignee: International Business Machines Corporation, Armonk, NY (US)

(*) Notice: Subject to any disclaimer, the term of this patent is extended or adjusted under 35 U.S.C. 154(b) by 121 days.

(21) Appl. No.: 13/005,777

(22) Filed: Jan. 13, 2011

(65) Prior Publication Data
US 2012/0185499 A1    Jul. 19, 2012

(51) Int. Cl.
*G06F 17/30* (2006.01)
*G06F 9/44* (2006.01)
*G06F 9/455* (2006.01)

(52) U.S. Cl.
CPC .............. *G06F 9/45558* (2013.01); *G06F 8/68* (2013.01)
USPC ........................................................ 707/769

(58) Field of Classification Search
CPC ................... G06F 17/30864; G06F 17/30867; G06F 17/3087
USPC .................................................. 707/667, 769
See application file for complete search history.

(56) References Cited

U.S. PATENT DOCUMENTS

| 5,574,906 | A  | * | 11/1996 | Morris ........................... 707/640 |
| 7,496,613 | B2 |   | 2/2009  | Raghunath |
| 8,019,731 | B2 | * | 9/2011  | Forster .......................... 707/667 |
| 2007/0027936 | A1 | * | 2/2007 | Stakutis et al. ............... 707/204 |
| 2008/0086728 | A1 | * | 4/2008 | Lam et al. ......................... 718/1 |
| 2009/0100420 | A1 | * | 4/2009 | Sapuntzakis et al. ......... 717/171 |
| 2009/0222468 | A1 | * | 9/2009 | Alpern et al. .................. 707/101 |
| 2009/0300076 | A1 | * | 12/2009 | Friedman et al. ............. 707/203 |
| 2010/0281208 | A1 | * | 11/2010 | Yang ............................. 711/103 |

OTHER PUBLICATIONS

B. Pfaff et al., "Virtualization Aware File Systems: Getting Beyond the Limitations of Virtual Disks," In Proceedings of the Third Symposium on Networked Systems Design and Implementation (NSDI '06) (San Jose, CA, USA, May 2006), pp. 353-356.

D. Reimer et al., "Opening Black Boxes: Using Semantic Information to Combat Virtual Machine Image Sprawl," In Proceeding of the Fourth ACM SIGPLAN/SIGOPS International Conference on Virtual Execution Environments (Seattle, WA, USA, Mar. 2008), ACM/USENIX, pp. 111-120.

* cited by examiner

*Primary Examiner* — Cam-Y Truong
(74) *Attorney, Agent, or Firm* — Cantor Colburn LLP; Preston Young

(57) ABSTRACT

A method for managing a virtual machine image includes receiving a request to change a package configuration of a machine, processing an image action received in the request, wherein the processing the image action received includes, opening the image action with associated action inputs, comparing the opened image action inputs with inputs associated with action instances in a database, determining whether the compared opened image action inputs match the inputs associated with action instances, retrieving from the database, image difference data associated with the image action responsive to determining that the compared opened image action inputs match the inputs associated with action instances in the database, and applying the image difference data to an image to transform the image, determining whether each image action in the request has been processed and processing a second image action responsive to determining that each image action has not been processed.

20 Claims, 5 Drawing Sheets

SCALABLE PACKAGE MANAGEMENT FOR VIRTUAL-MACHINE IMAGES

BACKGROUND

The present invention relates to virtual machine images, and more specifically, to methods and systems for administering and maintaining virtual machine images.

A virtual-machine image captures the complete configuration of one or more applications, including the software on which the applications depend, and can run on any physical machine with a compatible virtual-machine monitor. Thus, image repositories, are convenient and reliable ways for a user community to develop and share applications, including deploying them to physical machines, in the "cloud" or otherwise.

While images allow capturing, identifying, and distributing application configurations, a typical Unix distribution distributes software in the form of many interdependent packages, which are developed by thousands of people over the course of decades and stored by servers on the Internet. Administrators use a package manager to install, configure, remove, and upgrade packages.

Package managers may be used to manage the software configurations of millions of physical machines, from large compute clusters to cell phones. Data and images are easy to clone, version, snapshot, and customize; as a result, the repositories may grow to contain many more images than there are physical machines to run them. In the past, package managers only needed to operate on running systems. Designed with that assumption, package managers do not scale well when the number of images exceeds the physical resources available to run them.

BRIEF SUMMARY

According to one embodiment of the present invention, a method for managing a virtual machine image includes receiving a request to change a package configuration of a machine, processing an image action received in the request, wherein the processing the image action received includes, opening the image action with associated action inputs, comparing the opened image action inputs with inputs associated with action instances in a database, determining whether the compared opened image action inputs match the inputs associated with action instances in the database, retrieving from the database, image difference data associated with the image action responsive to determining that the compared opened image action inputs match the inputs associated with action instances in the database, and applying the image difference data to an image to transform the image, determining whether each image action in the request has been processed and processing a second image action responsive to determining that each image action has not been processed.

According to another embodiment of the present invention a system for managing virtual machine images includes a database, and a processor operative to receive a request to change a package configuration of a machine, process an image action received in the request, wherein the processing the image action received includes opening the image action with associated action inputs, comparing the opened image action inputs with inputs associated with action instances in a database, determining whether the compared opened image action inputs match the inputs associated with action instances in the database, retrieving from the database, image difference data associated with the image action responsive to determining that the compared opened image action inputs match the inputs associated with action instances in the database, and applying the image difference data to an image to transform the image, determining whether each image action in the request has been processed, and processing a second image action responsive to determining that each image action has not been processed.

According to yet another embodiment of the present invention a computer readable storage medium having instructions that include receiving a request to change a package configuration of a machine, processing an image action received in the request, wherein the processing the image action received includes, opening the image action with associated action inputs, comparing the opened image action inputs with inputs associated with action instances in a database, determining whether the compared opened image action inputs match the inputs associated with action instances in the database, retrieving from the database, image difference data associated with the image action responsive to determining that the compared opened image action inputs match the inputs associated with action instances in the database, and applying the image difference data to an image to transform the image, determining whether each image action in the request has been processed, and processing a second image action responsive to determining that each image action has not been processed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Software distributions such as, for example Linux are maintained through a package repository; each release of the distribution corresponds to a set of packages in the repository, which have been tested for compatibility. Each virtual machine image (image) contains a package database that lists the name of each package, an installation state, dependences on other packages, and the files associated with the package.

Package management tools such as, for example, Dpkg download packages from the repository via a network connection and change the installation state of packages on the image. Changes to a package state involve a sequence of small steps, including running scripts that perform a variety of package-specific tasks; for example, the post-upgrade script for a database management system may convert databases from the format used by a prior version of the system to the format used by the new version. Although state-changes are not protected by full transactions, Dpkg attempts to not corrupt the image if a state-change fails; to this goal, Dpkg is coded to allow each step to be rolled back individually on failure.

The Mirage Image Format (MIF) exposes file-sharing among images to the tools that manipulate the images. MIF maps each image file to a content identifier (often, a SHA1 hash) that uniquely identifies the content. A content-addressable store (CAS) holds the actual content. MIF images may be converted to a traditional format for execution on a virtual-machine. Recent versions of Mirage support mounting a MIF image filesystems into the Linux filesystem namespace; the contents of files may be fetched from the CAS only as demanded. However, the fastest way to manipulate a MIF image is to operate on the file-to-identifier map: Mirage provides an operation that, given a filename, returns the file content identifier; and an operation that, given a filename and a new content identifier, replaces the file content with the new identifier content. Operating on content identifiers may be faster than operating on content, because content identifiers are three orders of magnitude smaller than the contents of a file.

The embodiments described below include methods and systems for managing packages in an MIF image file system. In this regard, the embodiments identify similarities in package management operations and image configurations and increase the efficiency of the package management operations.

Figure 1:
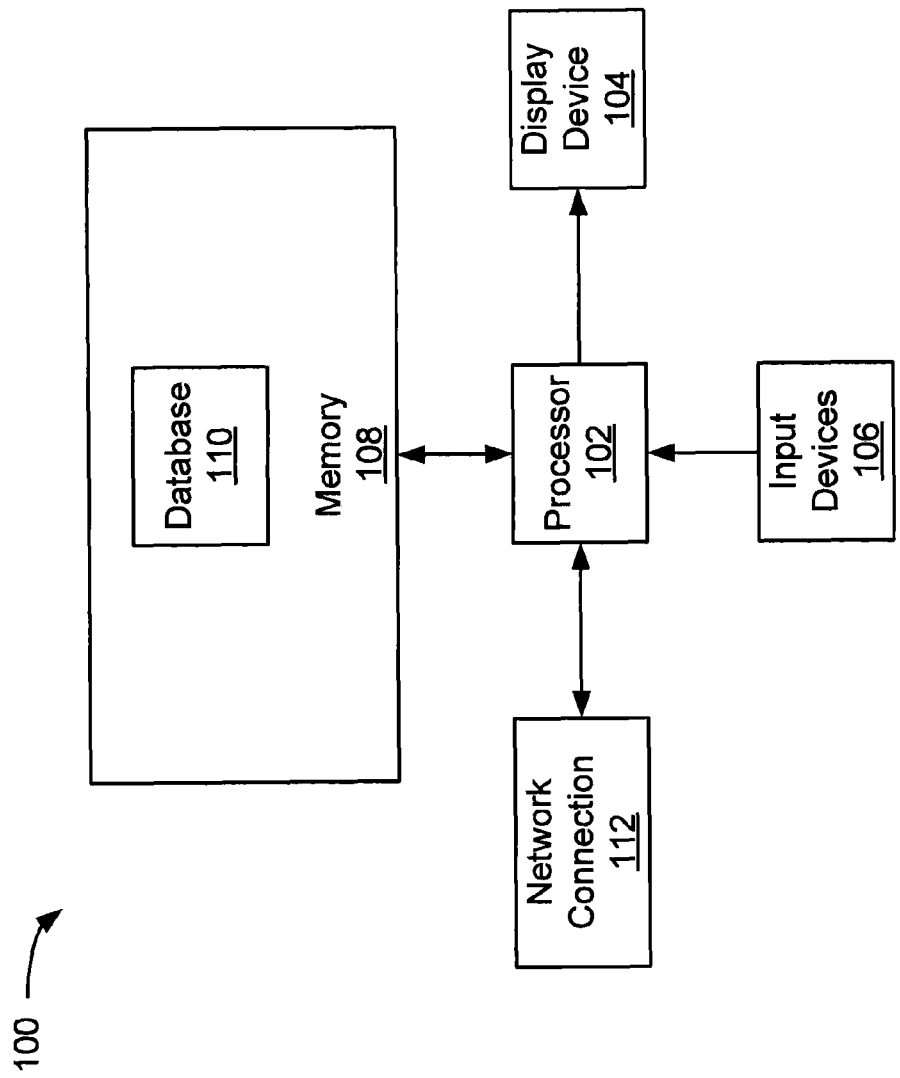
FIG. 1 illustrates an exemplary embodiment of a system for managing images.

FIG. 1 illustrates an exemplary embodiment of a system 100 for managing images that includes a processor 102 communicatively linked to a display device 104, input devices 106 and a memory 108 that may include, for example, a database 110, and a network connection 112 such as, for example, the Internet.

Figure 2:
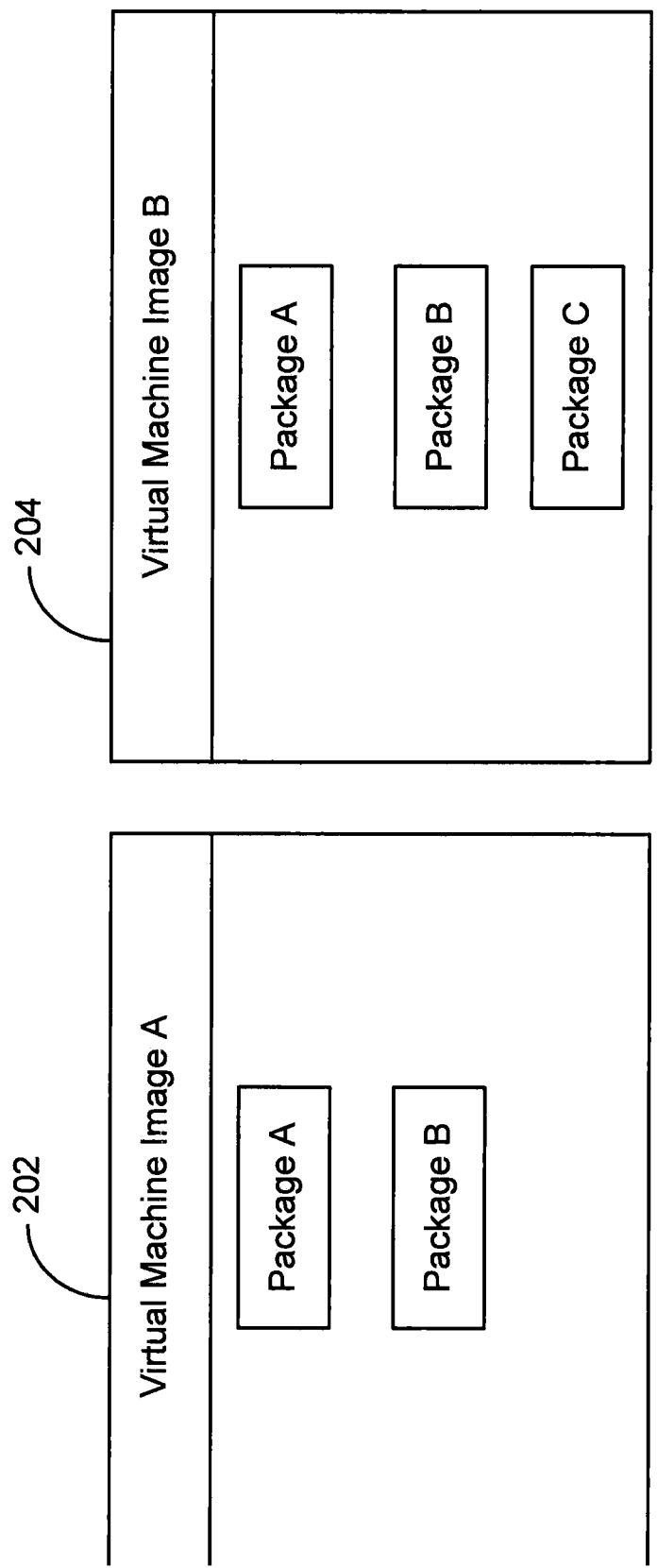
FIG. 2 illustrates an example of virtual machine images and packages.

FIG. 2 illustrates an example of virtual machine images and packages. FIG. 2 includes a virtual machine image (VMI) A 202 and a VMI B 204. The VMI A 202 includes a Package A and a Package B, while the VMI B 204 includes the Package A, Package B, and a Package C. In the illustrated embodiment, the VMA A 202 represents a beginning state of an image (I1) while the VMA B 204 represents an ending state of an image (I2).

Figure 3:
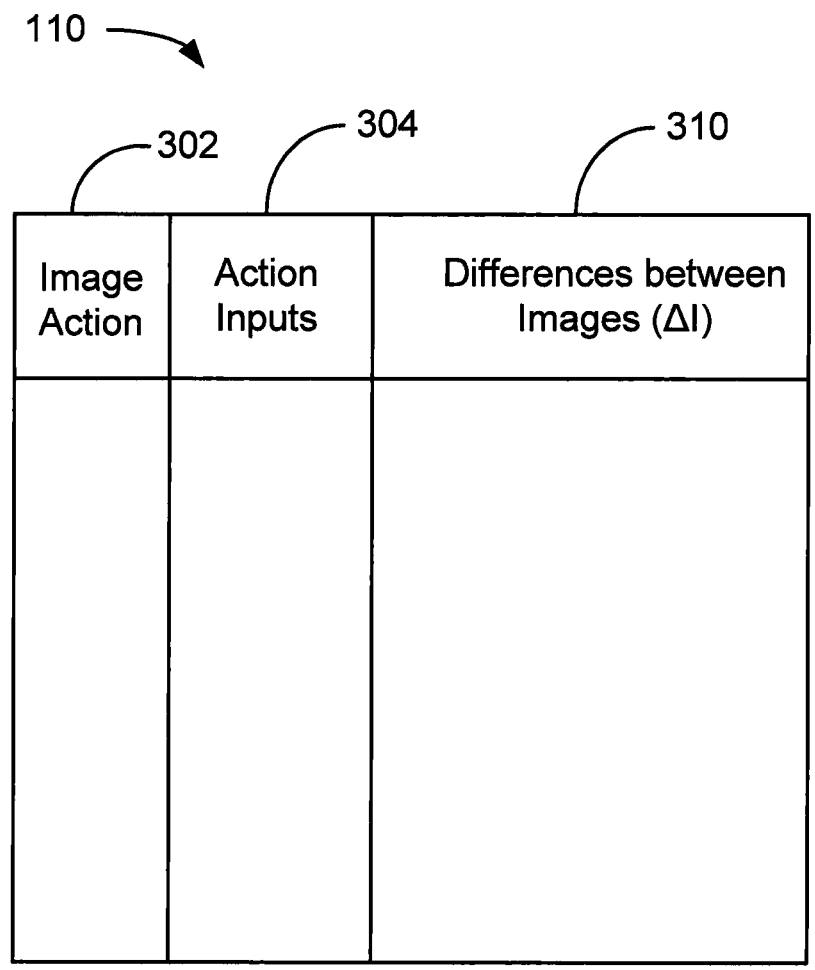
FIG. 3 illustrates an exemplary embodiment of a table that may be included in the database of FIG. 1.

FIG. 3 illustrates an exemplary embodiment of a table that may be included in the database 110 (of FIG. 1). The table includes image action (action) entries 302, action input entries 304, and a difference between images entries (ΔI) 310. An action entry 302 may include a description of the action being taken such as, for example, a description of a software update that adds a package to a virtual machine image. For example, referring to FIG. 2, VMI A 202 may be transformed to be similar to VMI B 204 by adding the Package C of VMI B 204 to VMI A 202. The action inputs 304 may include, for example, the states or data used by the action to perform the action, or content identifiers of the data used to perform the action. The ΔI 310 entry may include, for example, a data file that describes the differences between the beginning state of the image 202 and the end state of the image 204.

Figure 4A:
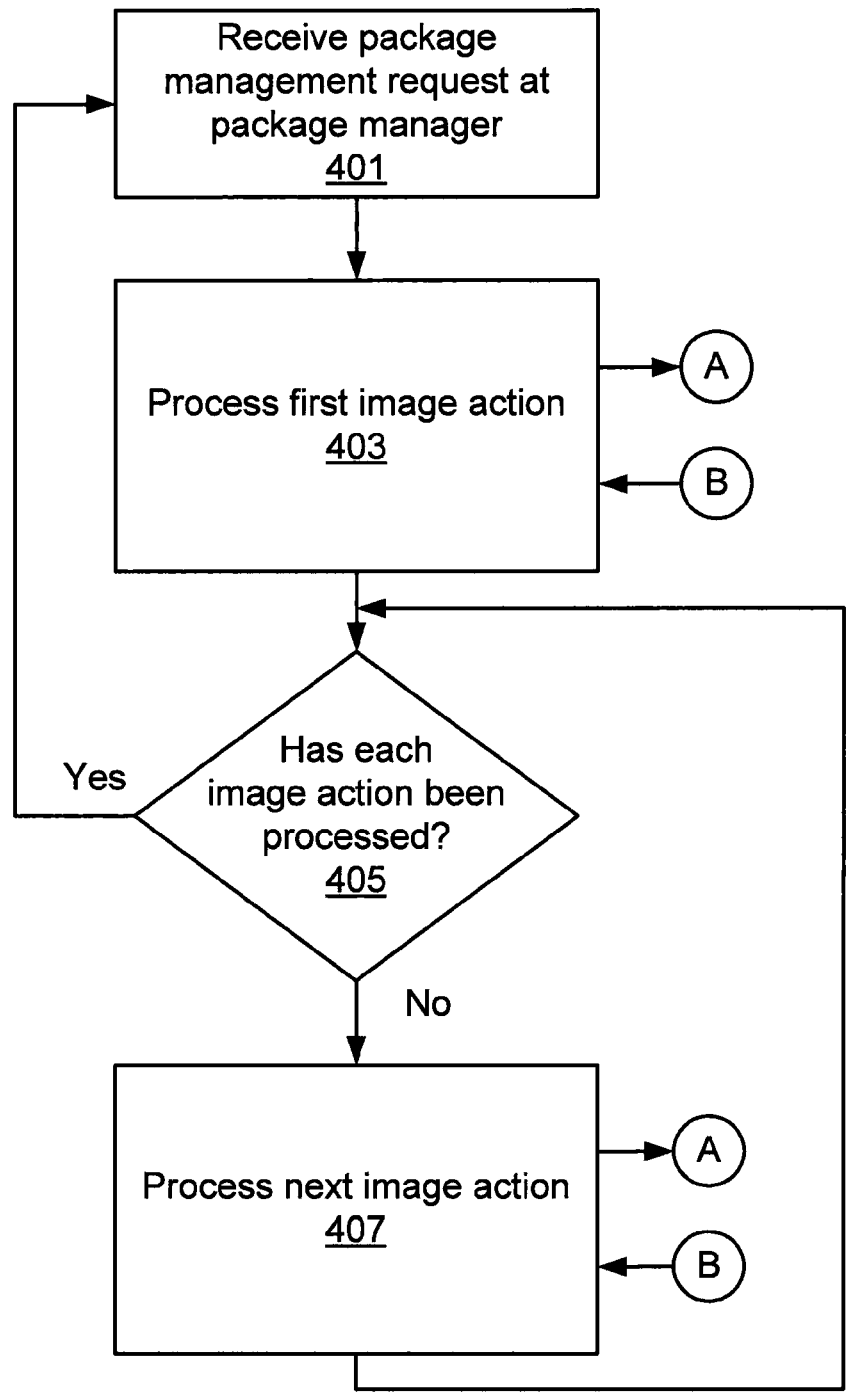
FIGS. 4A-4B illustrates a block diagram of an exemplary method for managing images.
Figure 4B:
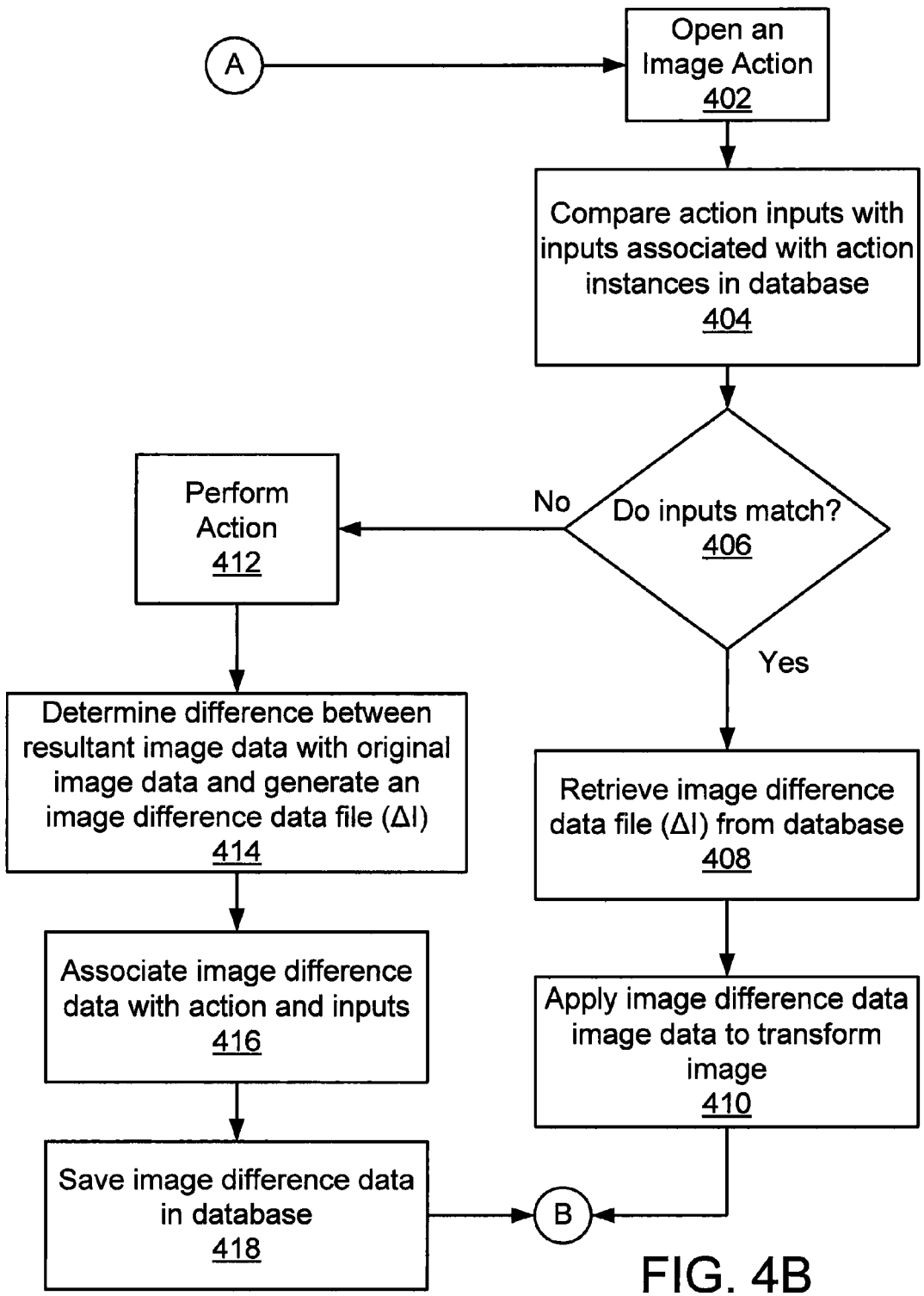

FIGS. 4A-4B illustrate a block diagram of an exemplary method for populating the table of FIG. 3, and using the database 110 to manage images. Referring to FIG. 4A, a package management request is received at a package manager in block 401. The package management request may be sent by a user and may include any variety of management actions such as, for example, installing a package, removing a package, upgrading a package, downgrading a package, or any other type of package manipulation that changes a package configuration of a machine. In block 403, a first image action is processed. The image action process is described in FIG. 4B.

Referring to FIG. 4B, in block 402, an image action that includes action inputs is opened. In block 404, the system 100 compares action inputs of the opened image action with action inputs associated with action instances present in the database 110 (of FIG. 3). Block 406 determines if the compared action inputs match. If the action inputs match, the ΔI data file is retrieved from the database 110 in block 408. In block 410, the image difference data ΔI is used to transform the image into a resultant image. The transformation may be performed on the data file of the VMI to perform the action, thus by changing the data of a VMI based on the ΔI data i.e., adding, replacing, and/or removing data, the resultant VMI will reflect the application of the desired action. If the inputs do not match (in block 406), block 412 performs the action on a VMI. Once the image action is performed, the original VMI data is compared with the resultant VMI data to generate an image difference data file (ΔI) in block 414. In block 416, the image difference data file (ΔI) is associated with the image action and image action inputs. The image difference data file (ΔI), the image action, and the image action inputs, are stored in the database 110 in block 418.

Referring to FIG. 4A, block 405 determines whether each image action has been processed from the package management request. If not, the next received image action is processed in block 407 in a similar manner as discussed above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for managing a virtual machine image, the method comprising:
   receiving a request to change a package configuration of a machine, the request including an image action;
   identifying the image action as a Mirage Image Format (MIF);
   processing the image action received in the request, wherein the processing the image action received includes:
      opening the image action with associated action inputs corresponding to the MIF;
      comparing the opened image action inputs with inputs associated with action instances corresponding to the MIF in a database, the comparing performed in response the opening the image action and prior to modifying an image;
      determining whether the compared opened image action inputs match the inputs associated with action instances in the database;
      retrieving from the database prior to modifying the image, previously generated image difference data associated with the image action responsive to determining that the compared opened image action inputs match the inputs associated with action instances in the database, the previously generated image difference data generated prior to the opening the image action; and applying the previously generated image difference data to the image in the MIF to transform the image in the MIF;

determining whether each image action in the request has been processed;

processing a second image action responsive to determining that each image action has not been processed;

in response to determining that the compared opened image action inputs do not match the inputs associated with action instances in the database, generating a new image difference data associated with the image action different from the previously generated image difference data without selection from a user;

performing the image action on the image to transform the image into a resultant image responsive to determining that the compared opened image action inputs do not match the inputs associated with action instances in the database;

determining a difference between the image and the resultant image; and generating image difference data including the difference between the image and the resultant image.

2. The method of claim 1, wherein the processing the image action received further includes:

associating the image difference data with the image action and associated action inputs; and saving the image difference data in the database.

3. The method of claim 1, wherein the processing the second image action includes:

opening an image action with associated action inputs;

comparing the opened image action inputs with inputs associated with action instances in a database;

determining whether the compared opened image action inputs match the inputs associated with action instances in the database;

retrieving from the database, image difference data associated with the image action responsive to determining that the compared opened image action inputs match the inputs associated with action instances in the database; and applying the image difference data to an image to transform the image.

4. The method of claim 3, wherein the processing the second image action further includes:

performing the image action on an image to transform the image into a resultant image responsive to determining that the compared opened image action inputs do not match the inputs associated with action instances in the database;

determining a difference between the image and the resultant image;

generating image difference data including the difference between the image and the resultant image;

associating the image difference data with the image action and associated action inputs; and saving the image difference data in the database.

5. The method of claim 1, wherein the image action includes a description of an action performed on the virtual machine image.

6. The method of claim 1, wherein the action inputs include data used to perform the action.

7. The method of claim 1, wherein the image difference data transforms the image by adding data to the image.

8. The method of claim 1, wherein the image difference data transforms the image by removing data from the image.

9. A system for managing virtual machine images, the system including:

a database; and a processor operative to receive a request to change a package configuration of a machine, process an image action received in the request and to identify the image action as a Mirage Image Format (MIF), wherein the processing the image action received includes opening the image action with associated action inputs corresponding to the MIF, comparing the opened image action inputs with inputs associated with action instances corresponding to the MIF in a database prior to modifying an image, determining whether the compared opened image action inputs match the inputs associated with action instances in the database, retrieving from the database prior to modifying the image, previously generated image difference data associated with the image action responsive to determining that the compared opened image action inputs match the inputs associated with action instances in the database, the previously generated image difference data generated prior to the opening the image action, and applying the previously generated image difference data to the image to transform the image in the MIF, determining whether each image action in the request has been processed, processing a second image action responsive to determining that each image action has not been processed, and in response to determining that the compared opened image action inputs do not match the inputs associated with action instances in the database, generating a new image difference data associated with the image action different from the previously generated image difference data without selection from a user, performing the image action on the image to transform the image into a resultant image responsive to determining that the compared opened image action inputs do not match the inputs associated with action instances in the database, determining a difference between the image and the resultant image, and generating image difference data including the difference between the image and the resultant image.

10. The system of claim 9, wherein the processing the image action received further includes:

associating the image difference data with the image action and associated action inputs; and saving the image difference data in the database.

11. The system of claim 9, wherein the processing the second image action includes:

opening an image action with associated action inputs;

comparing the opened image action inputs with inputs associated with action instances in a database;

determining whether the compared opened image action inputs match the inputs associated with action instances in the database;

retrieving from the database, image difference data associated with the image action responsive to determining that the compared opened image action inputs match the inputs associated with action instances in the database; and applying the image difference data to an image to transform the image.

12. The system of claim 11, wherein the processing the second image action further includes:

performing the image action on an image to transform the image into a resultant image responsive to determining that the compared opened image action inputs do not match the inputs associated with action instances in the database;
determining a difference between the image and the resultant image;
generating image difference data including the difference between the image and the resultant image;
associating the image difference data with the image action and associated action inputs; and
saving the image difference data in the database.

13. The system of claim 9, wherein the image action includes a description of an action performed on the virtual machine image.

14. The system of claim 9, wherein the action inputs include data used to perform the action.

15. The system of claim 9, wherein the image difference data transforms the image by adding data to the image.

16. The system of claim 9, wherein the image difference data transforms the image by removing data from the image.

17. A non-transitory computer readable storage medium having instructions that include:
    receiving a request to change a package configuration of a machine;
    identifying a image action as a Mirage Image Format (MIF);
    processing the image action received in the request, wherein the processing the image action received includes:
        opening the image action with associated action inputs corresponding to the MIF;
        comparing the opened image action inputs with inputs associated with action instances corresponding to the MIF in a database, the comparing performed prior to modifying an image;
        determining whether the compared opened image action inputs match the inputs associated with action instances in the database;
        retrieving from the database prior to modifying the image, previously generated image difference data associated with the image action responsive to determining that the compared opened image action inputs match the inputs associated with action instances in the database, the previously generated image difference data generated prior to the opening the image action; and
        applying the previously generated image difference data to the image in the MIF to transform the image in the MIF;
    determining whether each image action in the request has been processed;
    processing a second image action responsive to determining that each image action has not been processed;
    in response to determining that the compared opened image action inputs do not match the inputs associated with action instances in the database, generating a new image difference data associated with the image action different from the previously generated image difference data without selection from a user;
    performing the image action on the image to transform the image into a resultant image responsive to determining that the compared opened image action inputs do not match the inputs associated with action instances in the database;
    determining a difference between the image and the resultant image; and
    generating image difference data including the difference between the image and the resultant image.

18. The computer readable storage medium of claim 17, wherein the processing the image action received further includes:
    associating the image difference data with the image action and associated action inputs; and
    saving the image difference data in the database.

19. The computer readable storage medium of claim 17, wherein the image action includes a description of an action performed on the virtual machine image.

20. The computer readable storage medium of claim 17, wherein the action inputs include data used to perform the action.

* * * * *